US007710862B2

(12) United States Patent
McGee et al.

(10) Patent No.: US 7,710,862 B2
(45) Date of Patent: May 4, 2010

(54) METHOD AND SYSTEM OF ASSIGNING MEDIA ACCESS CONTROL (MAC) ADDRESSES ACROSS TEAMED COMMUNICATION PORTS

(75) Inventors: Michael Sean McGee, Austin, TX (US); Jeffrey D. Allen, Atlanta, GA (US); Mark C Stratton, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 822 days.

(21) Appl. No.: 11/468,537

(22) Filed: Aug. 30, 2006

(65) Prior Publication Data

US 2008/0056246 A1    Mar. 6, 2008

(51) Int. Cl.
    *H04J 3/14* (2006.01)
(52) U.S. Cl. .................................................. 370/216
(58) Field of Classification Search ........................ None
    See application file for complete search history.

(56) References Cited

U.S. PATENT DOCUMENTS

| | | | |
|---|---|---|---|
| 6,003,137 A * | 12/1999 | Kawasaki | 726/15 |
| 6,272,113 B1 * | 8/2001 | McIntyre et al. | 370/248 |
| 6,393,483 B1 * | 5/2002 | Latif et al. | 709/226 |
| 6,560,630 B1 | 5/2003 | Vepa et al. | |
| 7,505,401 B2 * | 3/2009 | Kashyap | 370/217 |
| 2003/0140124 A1 * | 7/2003 | Burns | 709/220 |
| 2005/0286503 A1 * | 12/2005 | Oda et al. | 370/355 |
| 2006/0029097 A1 | 2/2006 | McGee et al. | |
| 2006/0034190 A1 | 2/2006 | McGee et al. | |

* cited by examiner

*Primary Examiner*—Chirag G Shah
*Assistant Examiner*—Amarnauth Persaud

(57) ABSTRACT

A method and system of assigning media access control (MAC) addresses across teamed communication ports. At least some of the illustrative embodiments are methods comprising teaming a plurality of communication ports in a computer system to appear as a single virtual port to an application program (each communication port transmits message packets with any of a number M possible MAC addresses, wherein the number communication ports is greater than M), assigning a set of size M of MAC addresses to each of the plurality communication ports such that each MAC address appears in the set for a communication port for which the MAC address is the primary address (and such that each MAC address appears in M−1 other sets for other communication ports), and receiving a message packet from a client device across a network, the message packet directed to a primary MAC address of the first of the plurality communication ports.

18 Claims, 5 Drawing Sheets

METHOD AND SYSTEM OF ASSIGNING MEDIA ACCESS CONTROL (MAC) ADDRESSES ACROSS TEAMED COMMUNICATION PORTS

BACKGROUND

In order to implement communication fault tolerance, and in some cases increase data throughput, a computer system may couple to a network by way of a plurality of communication ports (hereinafter just ports), with the ports either implemented on a single network interface card (NIC) or the ports implemented on multiple NICs. The communication ports are "teamed" such that, regardless of the actual number of ports, the ports appear as a single port to an application level program.

In some cases distribution of inbound client-sourced message packets is by virtue of a software driver intercepting computer system responses to address resolution protocol (ARP) request messages from the clients, and selectively assigning media access control (MAC) addresses such that each client is given a particular port with which to communicate, however, MAC address assignments (and therefore port assignments) to each client by a software driver intercepting the ARP request messages causes the client to lose connection to the computer system if the assigned port has a communication fault. In order to regain communication to the client the computer system sends a gratuitous ARP reply directing all clients to communicate with a single port. As ARP timeouts occur and each individual client sends an ARP request message, the computer system again performs ARP intercept and load balances the remaining active ports across the clients.

BRIEF DESCRIPTION OF THE DRAWINGS

For a detailed description of illustrative embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
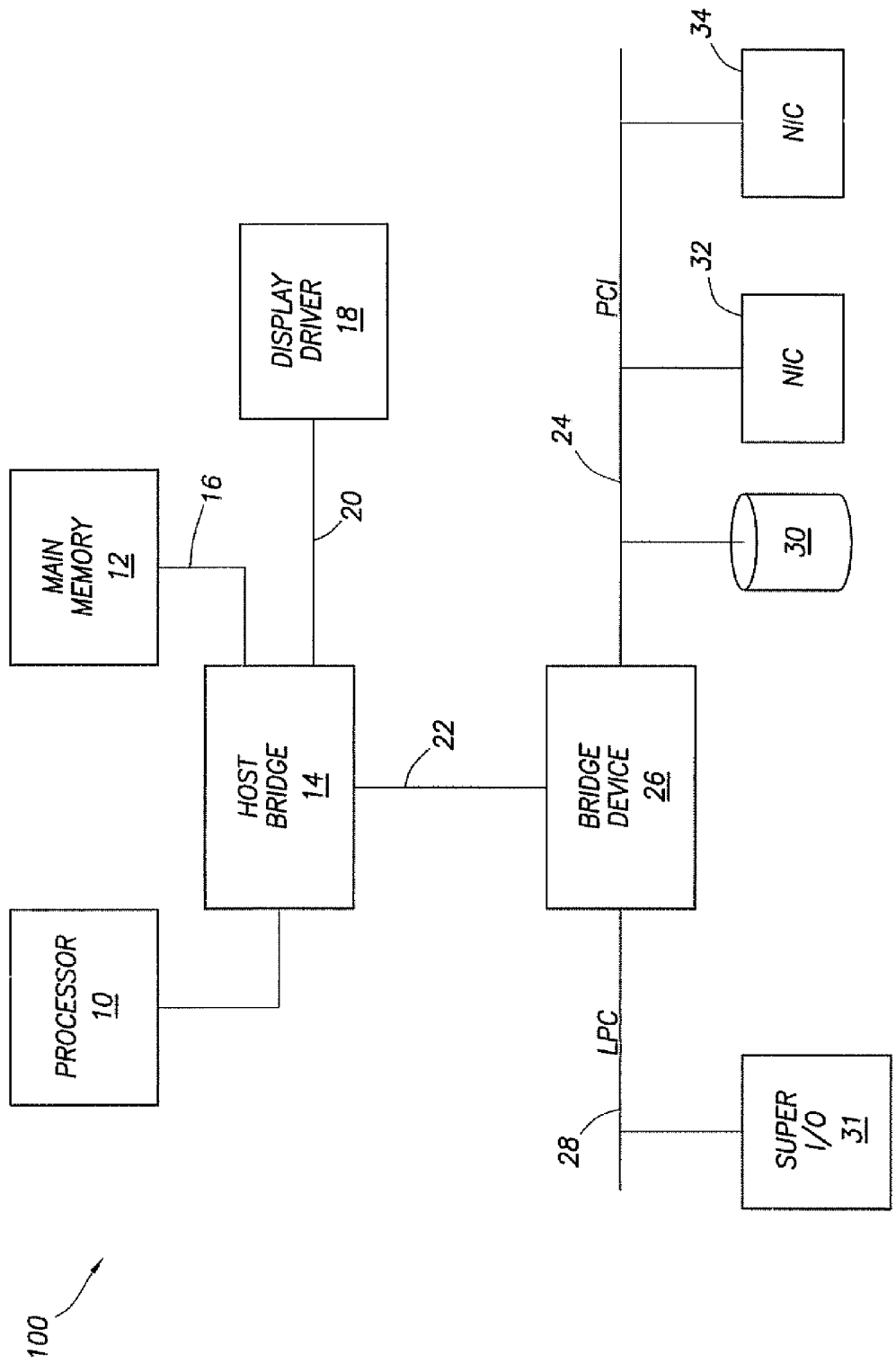
FIG. 1 illustrates a computer system in accordance with at least some embodiments.

FIG. 1 illustrates a computer system 100 in accordance with at least some embodiments. In particular, computer system 100 comprises at least one processor 10. In alternative embodiments the computer system 100 comprises multiple processors arranged in a configuration where parallel computing may take place. The processor 10 couples to a main memory array 12, and a variety of other peripheral computer system components, through a host bridge logic 14, although in some embodiments the host bridge logic 14 may be integrated with the processor 10. The main memory array 12 couples to the host bridge logic 14 through a memory bus 16. The host bridge logic 14 controls transactions to the main memory 12 by asserting control signals during memory accesses. The main memory 12 functions as the working memory for the processor 10 and comprises a memory device or array of memory devices in which program instructions and data are stored. The main memory array 12 may comprise any suitable type of memory, such as Dynamic Random Access Memory (DRAM) or any of the various types of DRAM devices such as Synchronous DRAM (SDRAM), Extended Data Output DRAM (EDO DRAM), or Rambus™ DRAM (RDRAM).

In some embodiments, text and video generated by software executing on the processor is provided to a display driver device 18 coupled to the host bridge 14 by way of an Advanced Graphics Port bus 20, PCI-Express, or other suitable type of bus. Alternatively, the display driver device could couple to the primary expansion bus 22 or one of the secondary expansion buses (i.e., the peripheral component interconnect (PCI) bus 24). The display device to which the display driver device 18 couples may comprise any suitable electronic display device upon which any image or text can be represented. In embodiments where the computer system 100 is a server system (e.g., in rack mounted enclosure with a plurality of other server systems), the display driver 18 may be omitted.

Computer system 100 also comprises a second bridge logic device 26 that bridges the primary expansion bus 22 to various secondary buses, such as a low pin count (LPC) bus 28, the PCI bus 24, and a Universal Serial Bus (USB). These secondary expansion buses are only illustrative, and other secondary expansion buses and bus protocols now in existence, or after-developed, may be equivalently used. In some embodiments, the bridge logic device 26 is an Input/Output (I/O) Controller Hub (ICH) manufactured by Intel Corporation. In the embodiments shown in FIG. 1 using an I/O Controller Hub as the second bridge logic device, the primary expansion bus 22 is a Hub-link bus, which is a proprietary bus of the Intel Corporation. However, computer system 100 is not limited to any particular chipset vendor, and thus other suitable buses as well as chipsets from other manufacturers may be equivalently used.

A Super Input/Output (I/O) controller 31 couples to the second bridge logic device 26 and controls many system functions. The Super I/O controller 31 may interface, for example, with a system pointing device, such as a mouse, a keyboard, and various serial ports and floppy drives. The Super I/O controller is referred to as "super" because of the many I/O functions it may perform. Because in some embodiments the computer system 100 is a server, the server may not have a dedicated mouse and keyboard.

Still referring to FIG. 1, the computer system 100 may further comprise a long term data storage device, such as disk drive system 30 coupled to the bridge logic device 26 by way of the illustrative PCI bus 24. The disk drive system 30 may be a single drive, or an array of drives operated as a redundant array of independent (or inexpensive) disks (RAID) system. While the illustrative disk drive system 30 is shown as coupled to the PCI bus 24, the disk drive system may equivalently couple to other buses, such as the primary expansion bus 22 or other secondary expansion buses.

The computer system 100 further comprises a plurality of network interface cards (NICs) or other form of network adapters. In the illustrative case of FIG. 1, the computer system 100 comprises NICs 32 and 34. The NICs 32 and 34 are message interfaces between the computer system 100 and one or more communication networks, such as an Ethernet network implementing a local area network (LAN) or wide area network (WAN). While FIG. 1 illustrates both NICs 32 and 34 coupled to the same PCI bus 24, in alternative embodiments the NICs may couple to different PCI buses, or buses having different communication protocols (e.g., one NIC coupled to the PCI bus, and a second NIC coupled to the primary expansion bus 22) to implement bus fault tolerance. Each NIC 32 and 34 implements at least one communication port, and each NIC may implement multiple communication ports. For example, a NIC may implement four or eight communication ports, and thus a NIC may implement four or eight separately controllable interfaces to four or eight different communication networks.

In accordance with some embodiments, two or more communication ports (hereinafter just "ports") may be grouped or teamed for purposes of fault tolerance and/or to increase communication throughput. Teamed ports may be implemented on the same NIC device, or the ports may span multiple NIC devices. Moreover, computer system 100 may implement multiple teams. Teamed ports represent redundant links to the communication network, and in some cases each port of a team may communicate over distinct paths or segments of the network that ultimately couple to a core switch.

If employed in a packet-switched network, each of the NICs 32 and 34 of FIG. 1 transmit message packets (e.g., Ethernet formatted packets) to clients on the network, and receive message packets generated by clients on the network. The formatting of the packets is defined by the implemented transmission protocol. Each device on a network uses one or more unique addresses by which it communicates with the other devices on the network, with each address (corresponding to one of the layers of the OSI model) embedded in the packets for both the source device and the destination device. A device uses an address at layer 2 (the data link layer) known as a media access control (MAC) address and an address at layer 3 (the network layer) known as a protocol address (e.g., Internet Protocol (IP), IP eXchange (IPX), AppleTalk). The MAC address can be thought of as being assigned to the physical hardware of the device, such as the NIC (or particular port of a NIC), whereas the protocol address is assigned to the software of the device. When multiple protocols reside on the same network device, a protocol address is assigned to each resident protocol.

For Ethernet networks, devices communicate directly using their respective layer 2 MAC addresses, even though the software for each device initiates communication with one or more other network devices using their protocol addresses. Ethernet devices first ascertain the MAC address corresponding to a particular protocol address of a destination device. For the IP protocol, this is accomplished by first consulting a cache of MAC address/protocol address pairs maintained by each network device known as an ARP cache. If an entry for a particular protocol address is not present, a process is initiated whereby the sending device broadcasts a request to all devices on the network requesting that the device having the destination protocol address reply with its MAC address. This is known as address resolution protocol (ARP) request, the result of which is then stored in the ARP cache for future use. The timeout period for entries in the ARP cache is dependent upon the operating system in use. ARP communication packets are formed by embedding the source and destination MAC addresses (48 bits each), as well as embedding the source and destination protocol addresses, in the payload of the packet. The source address indicates to the receiving device the identity of the source device from which the packet was received and thus to which device to respond if a response is required. For the IPX protocol, the ARP process is not needed as the MAC address is a constituent of the IP address.

Figure 2:
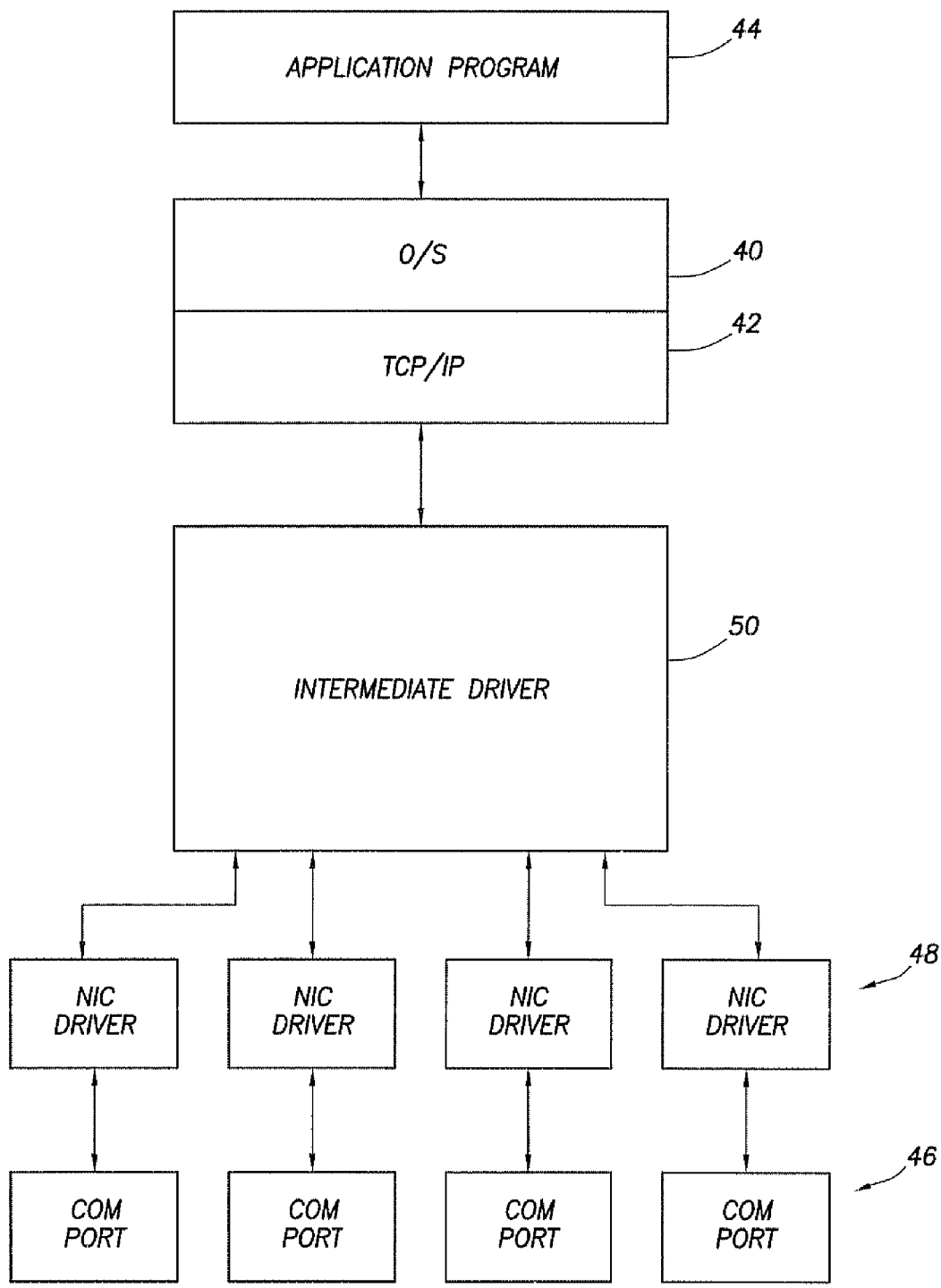
FIG. 2 illustrates the relationship of various software programs and/or drivers in accordance with an embodiment.

FIG. 2 illustrates the relationship of various pieces of software executed by the processor 10 to implement teaming in accordance with some embodiments. In particular, the computer system implements an operation system (O/S) 40 that supports networking. Any currently available or after developed operating system that supports networking may be used. In the illustrative case of FIG. 2, the operating system 40 supports a transmission control protocol/internet protocol (TCP/IP) stack 42, but other communication protocols may be implemented simultaneously or in the alternative (e.g., IPX, NetBUEI). The operating system 40, and in particular the illustrative TCP/IP protocol stack 42, enable one or more application programs 44 to communicate to other computer systems over a network.

Still referring to FIG. 2, each communication port 46 has associated therewith a NIC driver 48 (where each NIC driver may be alternatively referred to as a miniport driver). In cases where each NIC (e.g., NICs 32 and 34 of FIG. 1) are made by the same vendor and have the same capabilities, the NIC drivers 48 may be duplicate programs. However, the NICs need neither be made by the same vendor nor have the same capabilities. For example, one NIC may implement 100 megabit per second (Mbps) data throughput, while another NIC may implement 1000 Mbps (Gigabit) throughput, and in these alternative embodiments the NIC drivers may be vendor and/or capability specific. In spite of having different vendors and/or different capabilities, the various NICs, or their ports, may still be teamed in accordance with embodiments of the invention.

In situations where each port 46 operates independently, the illustrative TCP/IP stack 42 communicates directly with each NIC driver 48; however, in accordance with embodiments of the invention the communications ports 46 are teamed such that they appear as a single communication port to the TCP/IP stack 42 and application program 44. To enable teaming, an intermediate driver 50 interfaces between the illustrative TCP/IP stack 42 and the various drivers 48. More particularly, the intermediate driver 50 communicates with the illustrative TCP/IP stack 42, and appears to the TCP/IP stack as a single NIC driver. Likewise, the intermediate driver 50 appears as a TCP/IP stack to each of the NIC drivers 48. Operation of the intermediate driver 50 to implement receive load balancing is introduced with respect to FIGS. 3A and 3B.

Figure 3A:
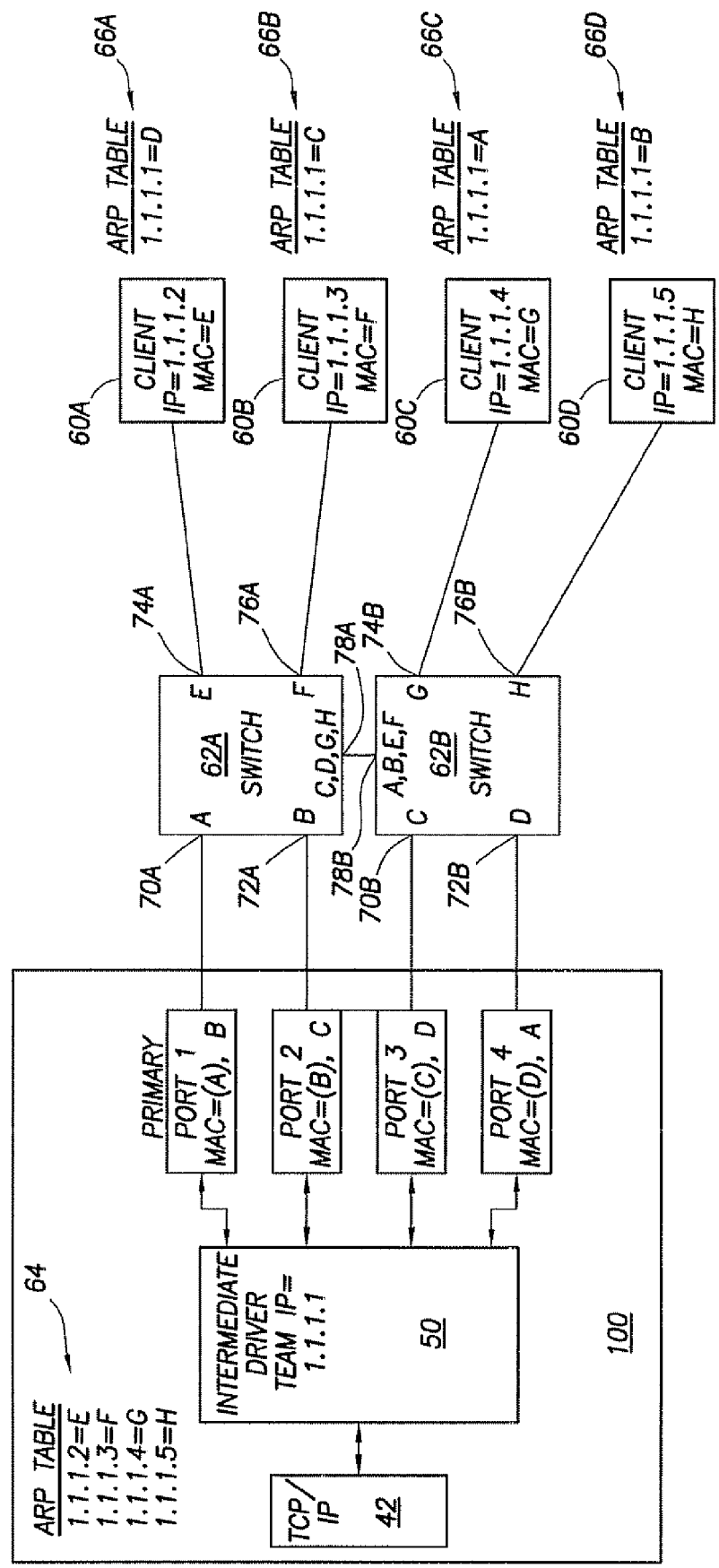
FIG. 3A illustrates a network system in accordance with some embodiments.

FIG. 3A illustrates computer system 100 coupled to a plurality of clients 60A-60D by way of switch devices 62A and 62B. The illustrative IP address for the teamed computer system 100 is 1.1.1.1. Likewise, the clients 60A-60D have an illustrative IP address 1.1.1.2, 1.1.1.3, 1.1.1.4 and 1.1.1.5 respectively. Each port 1-4 also has a primary MAC address A, B, C and D respectively, with the primary status of a MAC shown by having that MAC address within parenthesis. In accordance with embodiments of the invention, each port may utilize multiple MAC addresses, and thus each port 1-4 has a secondary MAC as indicated non-parenthetically. Assigning of the secondary MAC addresses is discussed more fully below. Each client 60A-60D likewise has a MAC address E, F, G and H respectively.

Consider for purposes of explanation that client 60A wishes to send a message to computer system 100. Initially, client 60A may only know the IP address of computer system 100 (e.g., by accessing a domain name server, which correlates domain names to network layer (i.e., layer 3) IP addresses). Using the illustrative IP address 1.1.1.1, client 60A sends a broadcast message to all devices on the network, the message requesting the MAC address of the device using IP address 1.1.1.1. Sending a broadcast message in this manner is referred to as an ARP request. The broadcast message may flow in any port of the teamed ports of computer system 100, and then the message flows through the intermediate driver 50 to the illustrative TCP/IP stack 42. The TCP/IP stack 42 views the teamed ports as a single port, and thus is aware of only one MAC address, most likely the MAC address of the primary port (in this example, port 1). The ARP response from the TCP/IP stack 42 to the client 60A is intercepted (and this process is referred to as ARP intercept) by the intermediate driver 50, and the intermediate driver replaces the MAC address supplied by the TCP/IP stack 42 with any MAC address of any of the teamed ports. Suppose that for purposes of receive load balancing the intermediate driver 50 modifies the ARP response to utilize the MAC address of port 4 (MAC=D), rather than MAC address of the primary port 1 (MAC=A) as supplied by the TCP/IP stack. The modified ARP response propagates out any of the teamed ports and eventually finds its way to client 60A, which client updates its ARP table 66A to indicate that IP address 1.1.1.1 is associated with MAC address D. From that point forward, each time the client 60A wishes to communicate with computer system 100 at IP address 1.1.1.1 the client 60A initiates a layer 2 message using MAC address D, which message then flows into the computer system 100 over port 4. When computer system 100 communicates for the first time with client 60A, a similar process is implemented, and computer system updates its ARP table 64.

Still referring to FIG. 3A, now consider that client 60B likewise wishes to send a message to computer system 100. Initially, client 60B may only know the IP address of computer system 100 (e.g., by accessing a domain name server) as 1.1.1.1. Using the IP address 1.1.1.1, client 60B sends a broadcast message to all devices on the network, the message requesting the MAC address of the device using IP address 1.1.1.1. The broadcast message flows in any port of the teamed ports of computer system 100, and then the message flows through the intermediate driver 50 to the illustrative TCP/IP stack 42. Again, because the TCP/IP stack 42 views the teamed ports as a single port, the TCP/IP stack 42 generates an ARP response that incorporates the MAC address of which it is aware, most likely the MAC address of the primary port 1. The ARP response from the TCP/IP stack 42 is again intercepted by the intermediate driver 50, and the intermediate driver replaces the MAC address supplied by the TCP/IP stack 42 with any MAC address of any of the teamed ports. Suppose that for purposes of receive load balancing the intermediate driver 50 modifies the ARP response to utilize the MAC address of port 3 (MAC=C), rather than MAC address of the primary port 1 (MAC=A) supplied by the TCP/IP stack. The modified ARP response propagates out any of the teamed ports, and eventually finds its way to client 60B. Client 60B updates its ARP table 66B to indicate that IP address 1.1.1.1 is associated with MAC address C. From that point forward, each time the client 60B wishes to communicate with computer system 100, the client initiates a layer 2 message using MAC address C, which message then flows into the computer system 100 over port 3. A similar process continues for each client, with the intermediate driver intercepting the ARP response, and replacing the MAC address with a MAC address to which the intermediate driver 50 wishes that client to communicate.

Selectively assigning MAC addresses in this manner thus implements receive load balancing on a client-by-client basis, without the necessity of having a switch device with the capabilities to perform load balancing and/or without requiring that all teamed ports couple to a single switch device. However, in the event of a port failure, communication to and from all clients who were provided the MAC address of the failed port is lost. In order to address this difficulty, and in accordance with embodiments of the invention, each port is assigned a set of MAC addresses. After the failure of one port, a port with a similarly assigned MAC address takes over receive responsibility for the failed port merely by informing the upstream switch devices by way of a message using the MAC address of the failed port.

In particular, each communication port in accordance with embodiments of the invention has the capability of operating with a MAC address as originally assigned by the manufacture, or operating with one or more MAC addresses programmatically assigned, such as by intermediate driver 50. In some embodiments, each communication port may be operable with up to four MAC addresses, but higher and lower numbers of operable MAC addresses are possible. FIG. 3A illustrates a situation where each port 1-4 may utilize either of two MAC addresses. Considering port 1 as an example, the MAC addresses that port 1 has been assigned and may use are MAC=A and MAC=B. The "A" address is shown in parenthesis to indicate that "A" is the primary or active MAC address for the port. Likewise, port 2 has an active MAC=B, and an additional MAC=C. Ports 3 and 4 have MAC addresses as illustrated. When all the ports 1-4 are operating properly, each port utilizes its primary or active MAC when sending message packets.

Switch devices 62A and 62B implement data tables (which may also be referred to as CAM tables) to keep track of the MAC addresses of devices available on each port of the switch devices. Considering switch device 62A, each port has a letter designation proximate to the port to indicate the MAC addresses of devices available on the particular port. Before the failure of a port in the computer system 100, port 1 of the computer system 100 is available on port 70A of the switch device 62A and has MAC=A. Port 2 of the computer system 100 is available on port 72A of switch device 62A and has MAC=B. Client 60A is available on port 74A of switch device 62A and has MAC=E. Client 60B is available on port 76A of switch device 62A and has MAC=F. Finally, switch device 62B is available on port 78A, and devices having MAC addresses C, D, G and H are thus available through port 78A. Likewise for switch device 62B before the failure of a port of the computer system 100, port 3 of the computer system 100 is available on port 70B of the switch device 62B and has MAC=C. Port 4 of the computer system 100 is available on port 72B of switch device 62B and has MAC=D. Client 60C is available on port 74B of switch device 62B and has MAC=G. Client 60D is available on port 76B of switch device 62A and has MAC=H. Finally, switch device 62A is available on port 78B, and devices having MAC addresses A, B, E and F are thus available through port 78B.

In accordance with at least some embodiments, upon the detection of the failure of one of the ports of the computer system, the intermediate driver 50 selects a non-failed port whose set of possible MAC addresses includes the MAC address of the now-failed port. Because the ports were previously programmed with multiple MAC addresses, the intermediate driver 50 does not have to reprogram any of the ports; rather, the intermediate driver need only notify the upstream switch devices of the new location for the MAC address. The intermediate driver 50 thus sends a broadcast message (also known as: a multicast message; a "heartbeat" message; a content addressable memory (CAM) table update message; a MAC table update message; or a Forwarding Database update message) from the selected non-failed port, with the broadcast message using the MAC address of the failed port. By sending a broadcast message from a non-failed port using the MAC address of the failed port as the source MAC address, the switch devices between the computer system 100 and the client update their tables to indicate that device having the MAC of the failed port is available through a different port of the switch device.

In the system of FIG. 3A, consider for purposes of explanation that port 1 fails. Upon detecting the failure of port 1 by any currently available or after-developed method, the intermediate driver 50 illustratively selects port 4, as port 4 shares an operable MAC address with port 1. If multiple ports of the computer system 100 share an operable MAC address with the failed port, the intermediate driver may select any of the ports that share the operable address. Once selected, the intermediate driver commands port 4 to send a broadcast message using the MAC address of the failed port 1. The broadcast message does not change the ARP table of the orphaned clients; rather, the broadcast message updates the CAM tables in the switch devices between the computer system 100 and the clients.

Figure 3B:
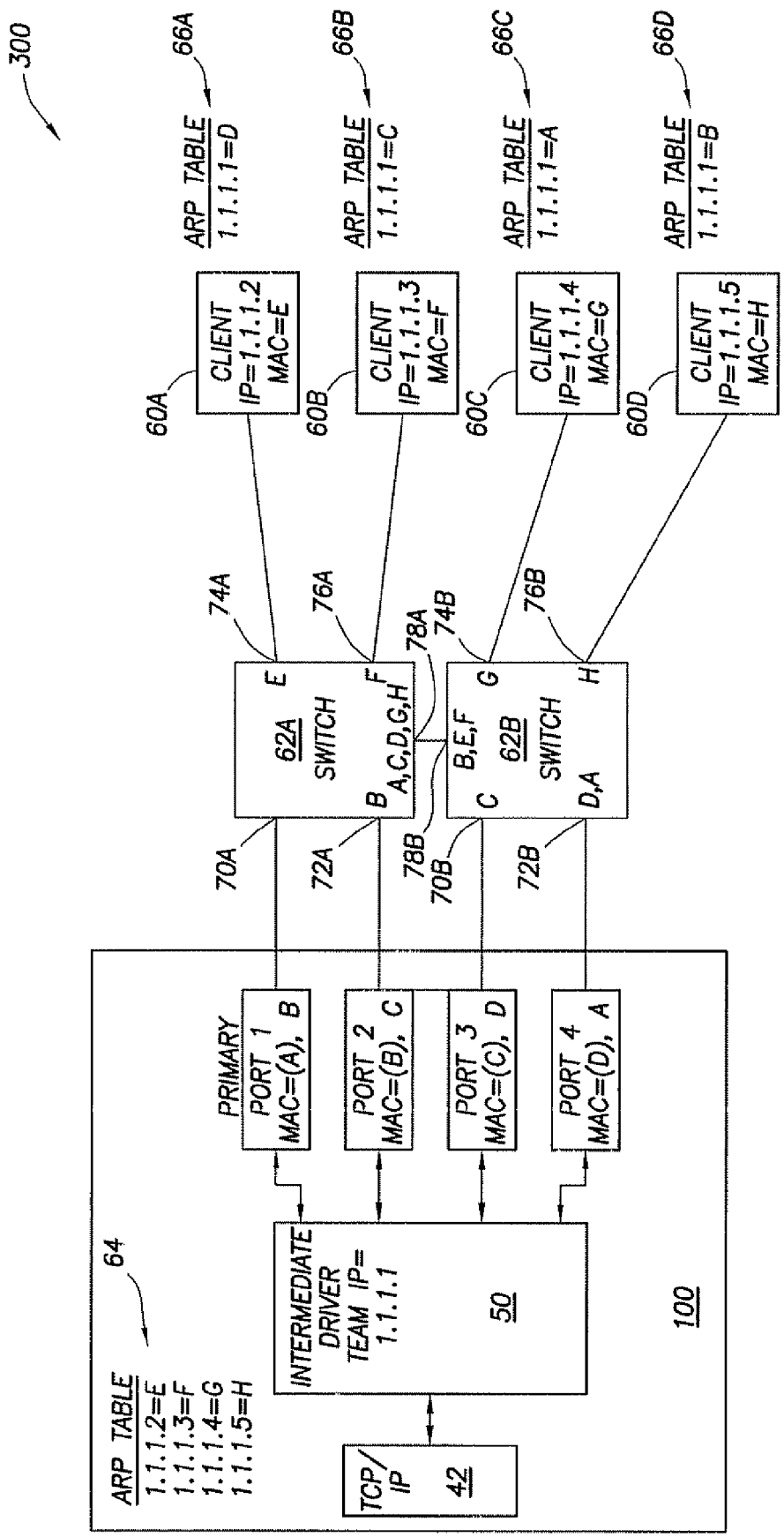
FIG. 3B illustrates the network system in accordance with some embodiments.

FIG. 3B illustrates CAM table state in the switch devices 62A and 62B after the illustrative selected port 4 sends the broadcast message in response to failure of port 1. In particular, switch device 62B makes a dual notation that MAC=A and MAC=D are available on port 72B, and removes the notation of the availability of MAC=A on port 78B. Likewise, upon receiving the broadcast message into port 78A, switch device 62A removes the notation regarding MAC=A being available on port 70A, and makes notation that MAC=A is now available on port 78A. Thus, when illustrative client 60C sends a message packet destined for MAC=A, the message packet is forwarded through switch device 62B across port 72B. Likewise, when client 60A sends a message packet destined for MAC=D, that message packet is forwarded through switch device 62A across port 78A, then through switch device 62B through port 72B. Recovery from a port failure may thus be accomplished in the amount of time it takes to identify the failure, and propagate a broadcast message to the intervening switch devices. Moreover, the recovery may be implemented without the necessity of changing the ARP tables 66 of the clients 60.

In accordance with embodiments of the invention, each port is assigned a set (of size M) of MAC addresses comprising a MAC address primarily used by the particular port (e.g., the MAC address assigned by the manufacturer or any MAC address assigned by the intermediate driver 50 or a locally administered address provided by an administrator), and M−1 secondary MAC addresses (the secondary MAC addresses being the primary MAC addresses used by other ports). In situations where the number N of ports in the same team is less than or equal to the set size M of MAC addresses for each port, each and every MAC address is assigned to each and every port. However, in the situation where the number N of ports in the same team is greater than the set size M, the MAC addresses are distributed across the ports in the same team to increase computer system reliability. In particular, and in accordance with embodiments of the invention, each MAC address appears in M sets of MAC addresses: in one set as the primary MAC address; and in M−1 sets as a secondary MAC address.

The embodiments discussed with respect to FIGS. 3A and 3B use four ports, each port operable with two MAC addresses. The following table shows a shorthand notation for the assignment of MAC addresses to the ports of the computer system 100 in FIGS. 3A and 3B.

TABLE 1

| PORT | MAC = |
|---|---|
| Port 1 | (A), B |
| Port 2 | (B), C |
| Port 3 | (C), D |
| Port 4 | (D), A |

In this illustrative situation M=2, and thus each MAC address appears is two sets of MAC addresses. Taking MAC address A, for example, MAC address A appears as the primary address in the set for port 1, and as a secondary address in the set for port 4. A computer system implementing set assignments illustrated in Table 1 could suffer loss of up to two non-contiguous ports (e.g., loss of ports 1 and 3, or loss of ports 2 and 4), and still have ports operable with all four MAC addresses.

Now consider a situation where a computer system has eight ports (N=8), with each port operable with four MAC addresses (M=4). In this situation, and in accordance with embodiments of the invention, assignments of the sets of MAC addresses for each port may take the form:

TABLE 2

| PORT | MAC = |
|---|---|
| Port 1 | (A), B, C, D |
| Port 2 | (B), C, D, E |
| Port 3 | (C), D, E, F |
| Port 4 | (D), E, F, G |
| Port 5 | (E), F, G, H |
| Port 6 | (F), G, H, A |
| Port 7 | (G), H, A, B |
| Port 8 | (H), A, B, C |

Here again, each MAC address appears in M sets of MAC addresses, one as the primary MAC address, and M−1 as a secondary MAC address. Taking MAC address A, for example, MAC address A appears as the primary address in the set for port 1, and as a secondary address in the set for ports 6-8.

A computer system implementing set assignments illustrated in Table 2 could suffer loss of up to three contiguous ports (i.e., consecutive assignment of sets, not necessarily port number), for example ports 1-3, and still have ports operable with all four MAC addresses. Such a failure scenario is illustrated in Table 3 below, with active MAC addresses for each port shown in parenthesis, and assuming ports 1-3 have failed.

TABLE 3

| PORT | MAC = |
|---|---|
| Port 1 | FAILED |
| Port 2 | FAILED |
| Port 3 | FAILED |
| Port 4 | (D), E, F, G |
| Port 5 | (E), F, G, H |
| Port 6 | (F), G, H, (A) |
| Port 7 | (G), H, A, (B) |
| Port 8 | (H), A, B, (C) |

Moreover, a system such as that illustrated in Table 2 could suffer the loss of up to six of the eight ports (e.g., ports 2-4 and 6-8), and still have ports operable with all four MAC addresses. Such a failure scenario is illustrated in Table 4 below, with active MAC addresses for each port shown in parenthesis, and assuming ports 2-4 and 6-8 have failed.

TABLE 4

| PORT | MAC = |
|---|---|
| Port 1 | (A), (B), (C), (D) |
| Port 2 | FAILED |
| Port 3 | FAILED |
| Port 4 | FAILED |
| Port 5 | (E), (F), (G), (H) |
| Port 6 | FAILED |
| Port 7 | FAILED |
| Port 8 | FAILED |

The set assignment of Table 2 is merely illustrative, and other combinations of MAC addresses in the sets may be equivalently used. For example, Table 5 shows an alternative set assignment for a system having eight ports, with each port operable with four MAC addresses:

TABLE 5

| PORT | MAC = |
|---|---|
| Port 1 | (A), C, E, G |
| Port 2 | (B), D, F, H |
| Port 3 | (C), E, G, A |
| Port 4 | (D), F, H, B |
| Port 5 | (E), G, A, C |
| Port 6 | (F), H, B, D |
| Port 7 | (G), A, C, E |
| Port 8 | (H), B, D, F |

While the illustrative port assignment of Table 5 is different than that of Table 2, each MAC address appears in M total sets, and accomplishes the same goal as the set assignment of Table 2.

Figure 4:
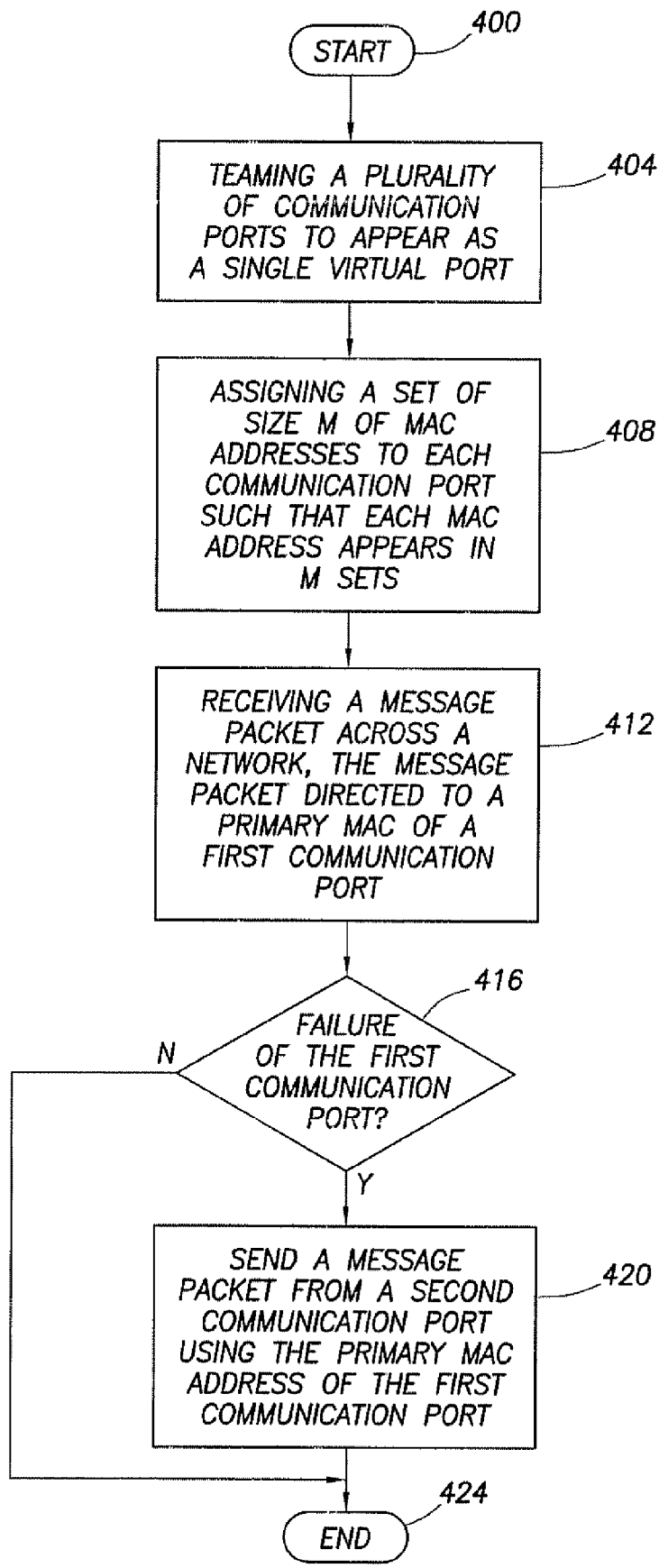
FIG. 4 illustrates a method in accordance with at least some embodiments.

FIG. 4 illustrates a method in accordance with at least some embodiments of the invention. In particular, the method starts (block 400) and proceeds to teaming a plurality of communication ports to appear as a single virtual port (block 404). In some embodiments, each port transmits message packets with any of a number M of possible media access control (MAC) addresses, wherein the number ports is greater than M. The teaming of illustrative block 404 may be accomplished by the intermediate driver 50. Next, a set (of size M) of MAC addresses is assigned to each of the communication ports such that each MAC address appears in M sets (block 408). That is, each MAC address is the primary MAC address for one port, and a secondary MAC address for M-1 ports.

After assignment of sets of MAC addresses, and after assigning MAC addresses to particular clients, a message packet is received at a first communication port from a client, the message packet directed to the primary MAC address of the first communication port (block 412). Thereafter, a determination is made as to whether there has been a failure of the first communication port (block 416). If not, the process ends (block 424). If there has been a failure of the first communication port, a message packet is sent from a second communication port using the primary MAC address of the first communication port (block 420), and the process ends (block 424). As discussed above, sending a broadcast message packet from the second port using the primary MAC address of the failed first port as the broadcast message packet's source MAC address forces switch devices between the computer system and the client to update their CAM tables, and when a client sends a message to the primary MAC address for the first port, the updated CAM tables forward the message to the second port given the failure of the first port.

There may be situations where a MAC address becomes obsolete, such as by replacing a NIC with a NIC utilizing a different primary MAC address. To address these situations, and in accordance with at least some embodiments, each time a NIC is removed which obsoletes a MAC address, a timer is started, where the timer is longer than ARP request renewal time. During the period of the timer, ports may continue to send message packets and receive message packets, but the obsolete MAC address is not to be given out in response to ARP requests. A situation where a port may need to send and receive using the obsolete MAC address may be when a first port fails and its NIC removed, and the second port transmits using the MAC address of the first port (and the MAC address of the second port). The continued sending and receiving to ensure connectivity of clients that were previously given the MAC address of the first port as an ARP response do not lose connectivity. After the timer expires, the obsolete MAC address should be removed from the sets MAC addresses for all the ports.

From the description provided herein, those skilled in the art are readily able to combine software created as described with appropriate general purpose or special purpose computer hardware to create a computer system and/or computer subcomponents embodying the invention, to create a computer system and/or computer subcomponents for carrying out the method of the invention and/or to create a non-transitory computer-readable media for storing a software program to implement the method aspects of the invention.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   teaming a plurality of communication ports by a processor in a computer system to appear as a single virtual port to an application program, each communication port transmits message packets with any of a number M possible media access control (MAC) addresses, wherein the plurality of communication ports numbers greater than M, and wherein M is greater than one;
   assigning a set of size M of MAC addresses by the processor, the MAC addresses assigned to each of the plurality of communication ports such that each MAC address appears in the set for a communication port for which the MAC address is a primary address, and such that each MAC address appears in M−1 other sets for other communication ports; and receiving a message packet from a client device across a network, the message packet directed to a primary MAC address of the first of the plurality communication ports.

2. The method as defined in claim 1 wherein teaming further comprises teaming the plurality of communication ports being eight communication ports.

3. The method as defined in claim 1 wherein teaming further comprises teaming where each communication port transmits with any of the plurality of MAC addresses being four MAC addresses.

4. The method as defined in claim 1 further comprising, upon the failure of the first of the plurality communication ports, sending a broadcast message from a second of the plurality communication ports, the set of MAC addresses of the second of the plurality having the primary MAC address of the first of the plurality communication ports, and the sending using the primary MAC address of the first of the plurality communication ports.

5. A computer system comprising:
a processor;
a memory coupled to the processor;
a first communication port coupled to the processor, the first communication port uses a first media access control (MAC) addresses and the first communication port also uses an additional MAC address;
a second communication port coupled to the processor, the second communication port uses a second MAC addresses and the second communication port also uses an additional MAC address;
a third communication port coupled to the processor, the third communication port uses a third MAC addresses and the third communication port also uses an additional MAC address;
wherein the processor configures the additional MAC address of first communication port to be the same as the second MAC address, wherein the processor configures the additional MAC address of the second communication port to be the same as the third MAC address, and wherein the processor configures the additional MAC address of the third communication port to be the same as the first MAC address.

6. The computer system as defined in claim 5 further comprising a first network interface card (NIC) coupled to the processor, wherein the NIC implements the first, second and third communication ports.

7. The computer system as defined in claim 5 further comprising:
a first network interface card (NIC) that implements the first communication port;
a second NIC that implements the second communication port; and
a third network interface card that implements the third communication port.

8. The computer system as defined in claim 5 wherein the processor configures the second communication port to send a broadcast message using the first MAC to an attached network switch device upon failure of the first communication port.

9. The computer system as defined in claim 5 wherein, upon failure of the first communication port, the processor redirects network traffic originally targeting the first communication port to the second communication port by sending a multicast message from the second communication port using the first MAC as the source address.

10. A non-transitory medium storing a program that, when executed by a processor, causes the processor to:
team a number N of communication ports in a computer system to appear as a single virtual port to an application program, each communication port transmits message packets with any of a number M media access control (MAC) addresses, wherein N is greater than M, and wherein N is greater than two and M is greater than one;
assign a set of MAC addresses (the set of size M) to each communication port such that each MAC address appears in the set of MAC addresses for the communication port for which the MAC address is the primary address, and such that each MAC address appears in M−1 other sets of MAC addresses for other communication ports; and
send a message from a first communication port, the set of MAC addresses of the first communication port having the primary MAC address of the first communication port, and the sending using the MAC address associated primarily with a second communication port distinct from the first communication.

11. The non-transitory computer-readable medium as defined in claim 10 wherein when the processor teams the program causes the processor to team the number N of communication ports being eight communication ports.

12. The non-transitory computer-readable medium as defined in claim 10 wherein when the processor teams the program causes the processor to team where each communication port transmits with any of the M MAC addresses of the set of MAC addresses, with M being four.

13. A non-transitory computer-readable medium storing a program that, when executed by a processor, causes the processor to:
team a number N of communication ports in a computer system to appear as a single virtual port to an application program, each communication port transmits message packets with any of a number M media access control (MAC) addresses, wherein N is greater than M, and wherein N is greater than two and M is greater than one;
assign a set of MAC addresses (the set of size M) to each communication port such that each MAC address appears in the set of MAC addresses for the communication port for which the MAC address is the primary address, and such that each MAC address appears in M−1 other sets of MAC addresses for other communication ports; and upon the failure of a first communication port; and
send a broadcast message from a second communication port, the set of MAC addresses of the second communication port having the primary MAC address of the first communication port, and the sending using the MAC address associated primarily with the first communication port.

14. A computer system comprising:
a means for executing programs;
a means for storing data and instructions, the means for storing coupled to the means for executing;
a first means for communicating with a network coupled to the means for executing, the first means for communicating uses a first media access control (MAC) address and an additional MAC address;
a second means for communicating with a network coupled to the means for executing, the second means for communicating uses a second MAC addresses and an additional MAC address;

a third means for communicating coupled to the means for executing, the third means for communicating uses a third MAC addresses and an additional MAC address;

wherein the means for executing configures the additional MAC address of first means for communicating to be the same as the second MAC address, wherein the means for executing configures the additional MAC address of the second means for communicating to be the same as the third MAC address, and wherein the means for executing configures the additional MAC address of the third means for communicating to be the same as the first MAC address.

15. The computer system as defined in claim 14 wherein the first, second and third means for communicating each comprise a communication port implemented on a first network interface card (NIC).

16. The computer system as defined in claim 14 further comprising:

wherein the first means for communicating is implemented on a first network interface card (NIC);

wherein the second means for communicating is implemented on a second NIC; and wherein the third means for communicating is implemented on a third NIC.

17. The computer system as defined in claim 14 wherein the means for executing configures the second means for communicating to send a broadcast message using the first MAC to an attached network switch device upon failure of the first means for communicating.

18. The computer system as defined in claim 14 wherein, upon failure of the first means for communicating, the means for executing redirects network traffic originally targeting the first means for communicating to the second means for communicating by sending a multicast message from the second means for communicating using the first MAC as a source address.

* * * * *

UNITED STATES PATENT AND TRADEMARK OFFICE
CERTIFICATE OF CORRECTION

PATENT NO. : 7,710,862 B2 Page 1 of 1
APPLICATION NO. : 11/468537
DATED : May 4, 2010
INVENTOR(S) : Michael Sean McGee et al.

It is certified that error appears in the above-identified patent and that said Letters Patent is hereby corrected as shown below:

In column 12, line 3, in Claim 10, before "medium" insert -- computer-readable --.

Signed and Sealed this

Twenty-fourth Day of August, 2010

David J. Kappos
*Director of the United States Patent and Trademark Office*